(12) United States Patent
Caliskan et al.

(10) Patent No.: US 11,114,722 B2
(45) Date of Patent: Sep. 7, 2021

(54) VEHICLE BATTERY MODULE

(71) Applicant: Ford Global Technologies, LLC, Dearborn, MI (US)

(72) Inventors: Ari Garo Caliskan, Canton, MI (US); Aref Vandadi, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 16/239,112

(22) Filed: Jan. 3, 2019

(65) Prior Publication Data

US 2020/0220125 A1   Jul. 9, 2020

(51) Int. Cl.
| | |
|---|---|
| *H01M 50/20* | (2021.01) |
| *H01M 10/613* | (2014.01) |
| *H01M 10/625* | (2014.01) |
| *H01M 10/6556* | (2014.01) |
| *B60L 50/64* | (2019.01) |
| *B60L 50/60* | (2019.01) |
| *B60K 1/04* | (2019.01) |

(52) U.S. Cl.
CPC ............ *H01M 50/20* (2021.01); *B60L 50/64* (2019.02); *H01M 10/613* (2015.04); *H01M 10/625* (2015.04); *H01M 10/6556* (2015.04); *B60K 1/04* (2013.01); *B60K 2001/0438* (2013.01); *B60L 50/66* (2019.02); *B60Y 2200/91* (2013.01); *B60Y 2400/112* (2013.01); *H01M 2220/20* (2013.01)

(58) Field of Classification Search
CPC ............ H01M 2/1077; H01M 2/1083; H01M 10/613; H01M 10/625; H01M 10/6556; B60L 50/64; B60L 50/66; B60K 1/04; B60K 2001/0438; B60Y 2200/91; B60Y 2400/112; Y02E 60/10
See application file for complete search history.

(56) References Cited

U.S. PATENT DOCUMENTS

| | | | |
|---|---|---|---|
| 10,003,112 B1 * | 6/2018 | Boor | H01M 10/6556 |
| 2011/0104547 A1 * | 5/2011 | Saito | H01M 10/625 |
| | | | 429/120 |
| 2015/0318523 A1 * | 11/2015 | Maeda | H01M 2/1077 |
| | | | 320/128 |

(Continued)

FOREIGN PATENT DOCUMENTS

| | | |
|---|---|---|
| DE | 102017203519 A1 | 9/2018 |
| JP | 2012227120 A | 11/2012 |
| WO | 2016129473 A1 | 8/2016 |

OTHER PUBLICATIONS

Samsung SDI, "Prismatic Lithium-ion Battery Cell" Battery Module retrieved from the Internet URL: http://samsungsdi.com/automotive-battery/products/prismatic-lithium-ion-battery-cell.html (1 page).

*Primary Examiner* — Brittany L Raymond
(74) *Attorney, Agent, or Firm* — David Coppiellie; Bejin Bieneman PLC

(57) ABSTRACT

A vehicle includes members spaced from each other and elongated along a vehicle-longitudinal axis. A battery module includes end plates spaced from each other along the vehicle-longitudinal axis. Battery cells are sandwiched between the end plates and a connector extends from one end plate to the other end plate. The end plates extend from one of the members to the other of the members.

15 Claims, 9 Drawing Sheets

(56) References Cited

U.S. PATENT DOCUMENTS

2016/0104921 A1    4/2016  Chorian et al.
2017/0313170 A1*  11/2017  Hara .................. H01M 2/1077
2017/0365894 A1   12/2017  Kwon et al.
2018/0205045 A1    7/2018  Schröder et al.

* cited by examiner

VEHICLE BATTERY MODULE

BACKGROUND

A battery-electric vehicle includes battery cells that power the vehicle, including propulsion of the vehicle. For example, wheels of the vehicle are powered by electric motors that are powered by the battery cells. As one example, the battery cells may be pouch cells having a flexible outer bag and electrodes, e.g., conductive foil tabs, that extend through the flexible outer bag. In such an example, the battery cells are stacked in a battery compartment of a battery tray.

DETAILED DESCRIPTION

Figure 1:
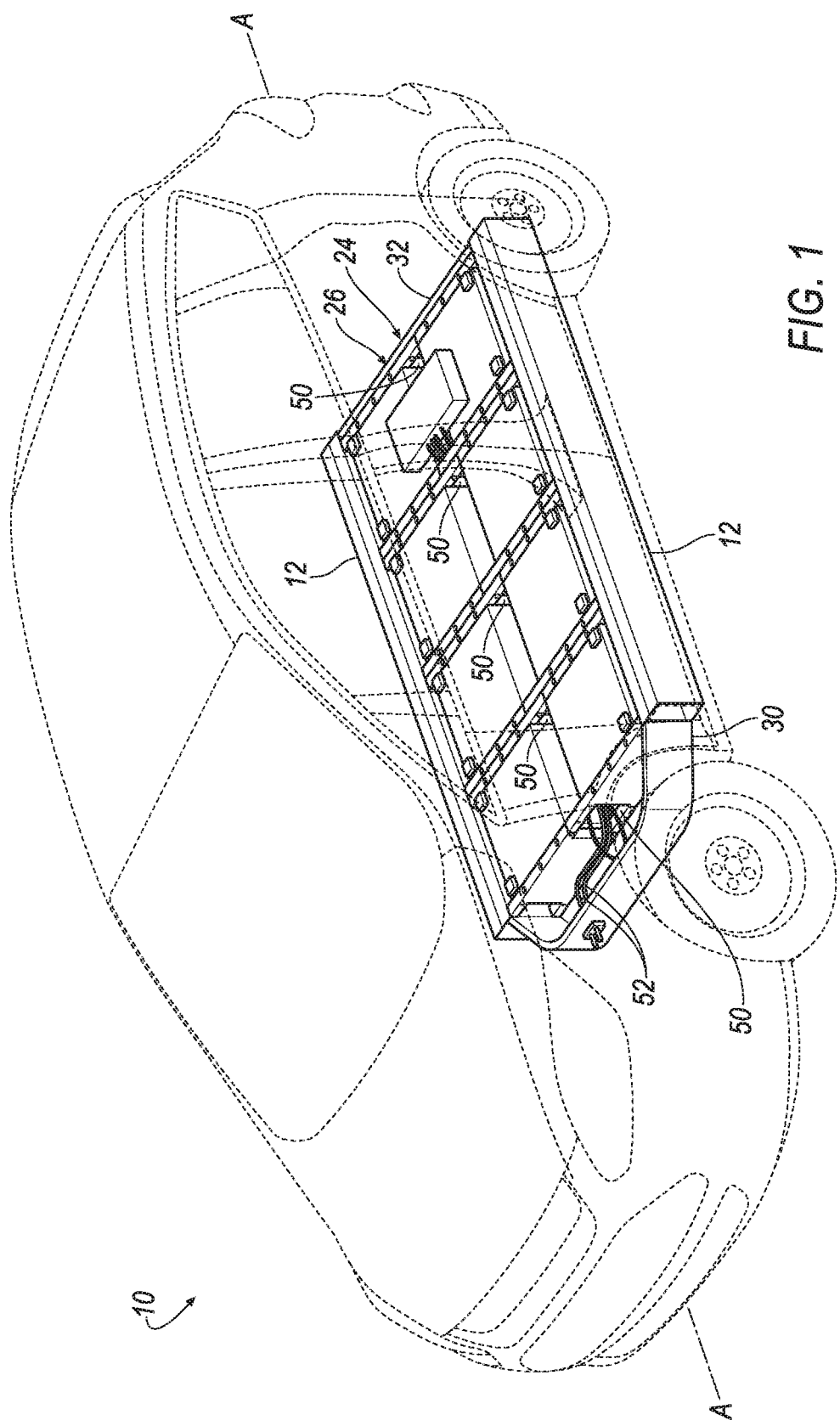
FIG. 1 is a perspective view if a vehicle-battery assembly in a vehicle.

With reference to the Figures, wherein like numerals indicate like parts throughout the several views, a vehicle 10 includes members 12 spaced from each other and elongated along an axis, e.g., a vehicle longitudinal axis A. The vehicle 10 includes a battery module 14. The battery module 14 includes end plates 16 spaced from each other along the vehicle longitudinal axis A. The battery module 14 includes battery cells 18 sandwiched between the end plates 16 and a connector 20 extending from one end plate 16 to the other end plate 16. The end plates 16 extend from one of the members 12 to the other of the members 12.

Since the end plates 16 extend from one of the members 12 to the other of the members 12, in the event of one of the members 12 being impacted, e.g., during a vehicle 10 impact, the end plates 16 transfer loads from the impacted member to the other member to eliminate or reduce loads on the battery cells 18. The end plates 16 of the battery module 14 sandwich the battery cells 18 and also reinforce the battery module 14 to transfer loads between members 12 during vehicle impact.

Figure 9:
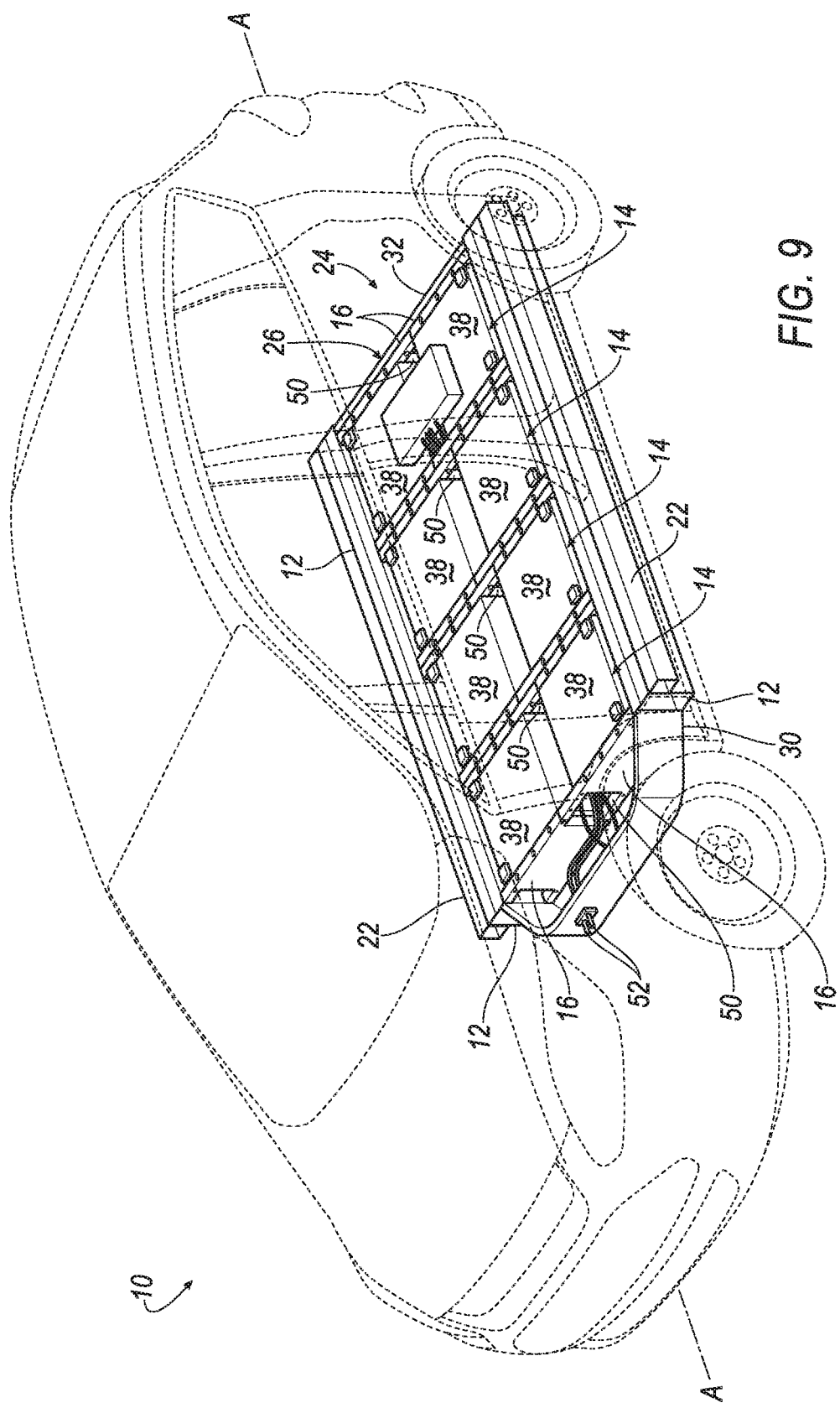
FIG. 9 is a perspective view of the vehicle-battery module assembled to a frame rail of a vehicle.

With reference to FIG. 1, the vehicle 10 includes a vehicle frame. The vehicle 10 frame may be of a unibody construction in which the frame is unitary with a vehicle body (including frame rails 22, pillars, roof rails, etc.). As another example, the body and frame may have a body-on-frame construction (also referred to as a cab-on-frame construction) in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc. In any construction, the vehicle 10 may include the frame rails 22, as shown in FIG. 9. Architectural components of the vehicle 10, e.g., pillars, body panels, bumpers, etc., are connected directly to and/or supported on the frame rails 22.

As set forth above, the vehicle 10 includes the vehicle longitudinal axis A. The vehicle-longitudinal direction extends fore-and-aft along the direction of travel of the vehicle 10.

The vehicle 10 is a battery-electric vehicle. In other words, propulsion of the vehicle 10 is powered electrically by the battery cells 18. For example, wheels of the vehicle 10 are powered by electric motors. The vehicle 10 may be of any type, e.g., a passenger automobile, taxi, ride-sharing automobile, etc.

A vehicle-battery assembly 24 includes a tray 26 and at least one battery module 14 fixed to the tray 26. For example, the vehicle-battery assembly 24 shown in FIG. 1 includes four battery modules 14. In examples including multiple battery modules 14, adjacent ones of the battery modules 14 are connected to each other, as described further below. The tray 26 may include a battery compartment 28 that receives the battery modules 14. The vehicle-battery assembly 24 may include any suitable hardware, e.g., wiring, connectors 20, circuits, etc., connecting the battery modules 14 to each other and to electrified components of the vehicle 10.

Figure 2:
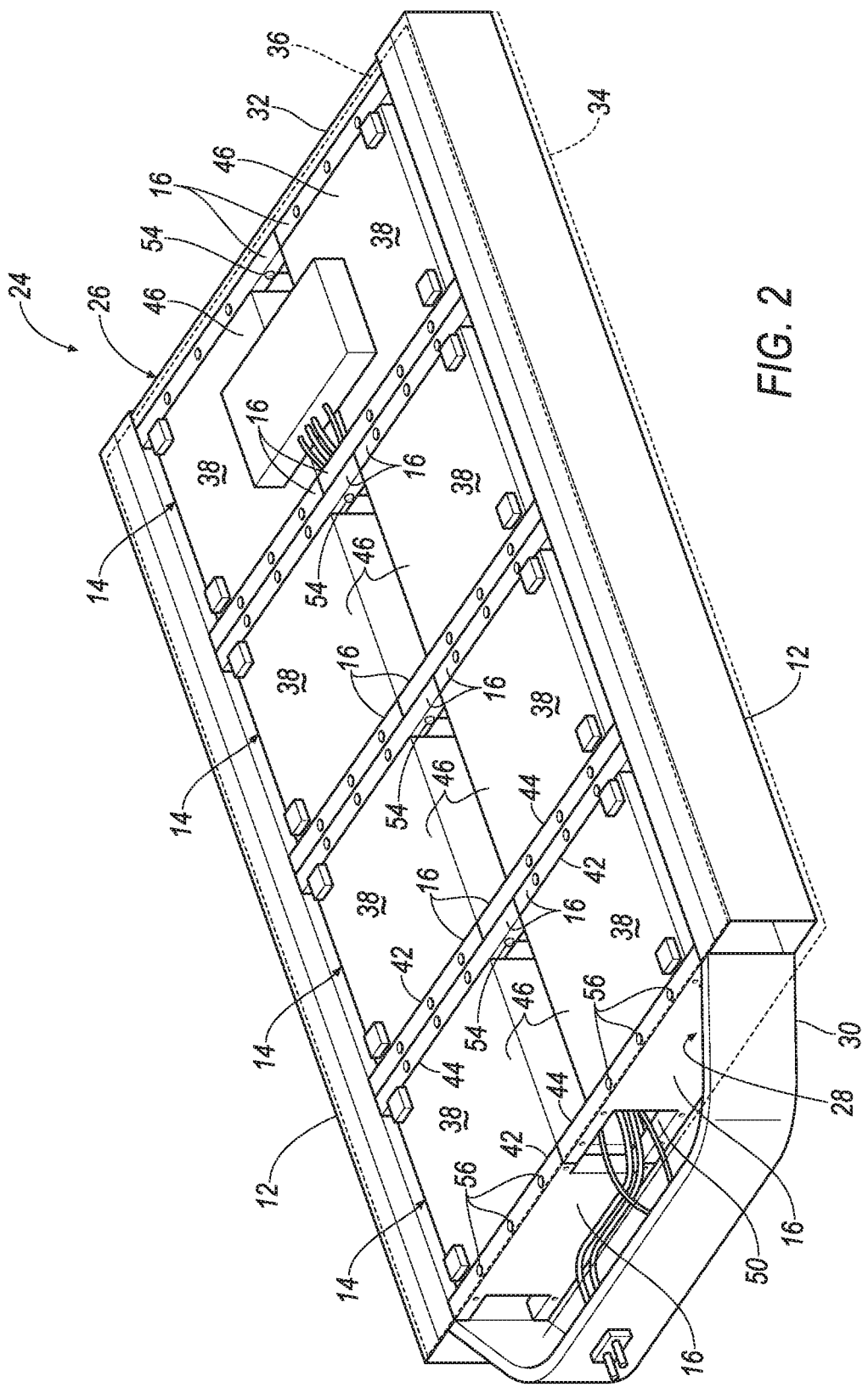
FIG. 2 is a perspective view of the vehicle-battery assembly.
Figure 3:
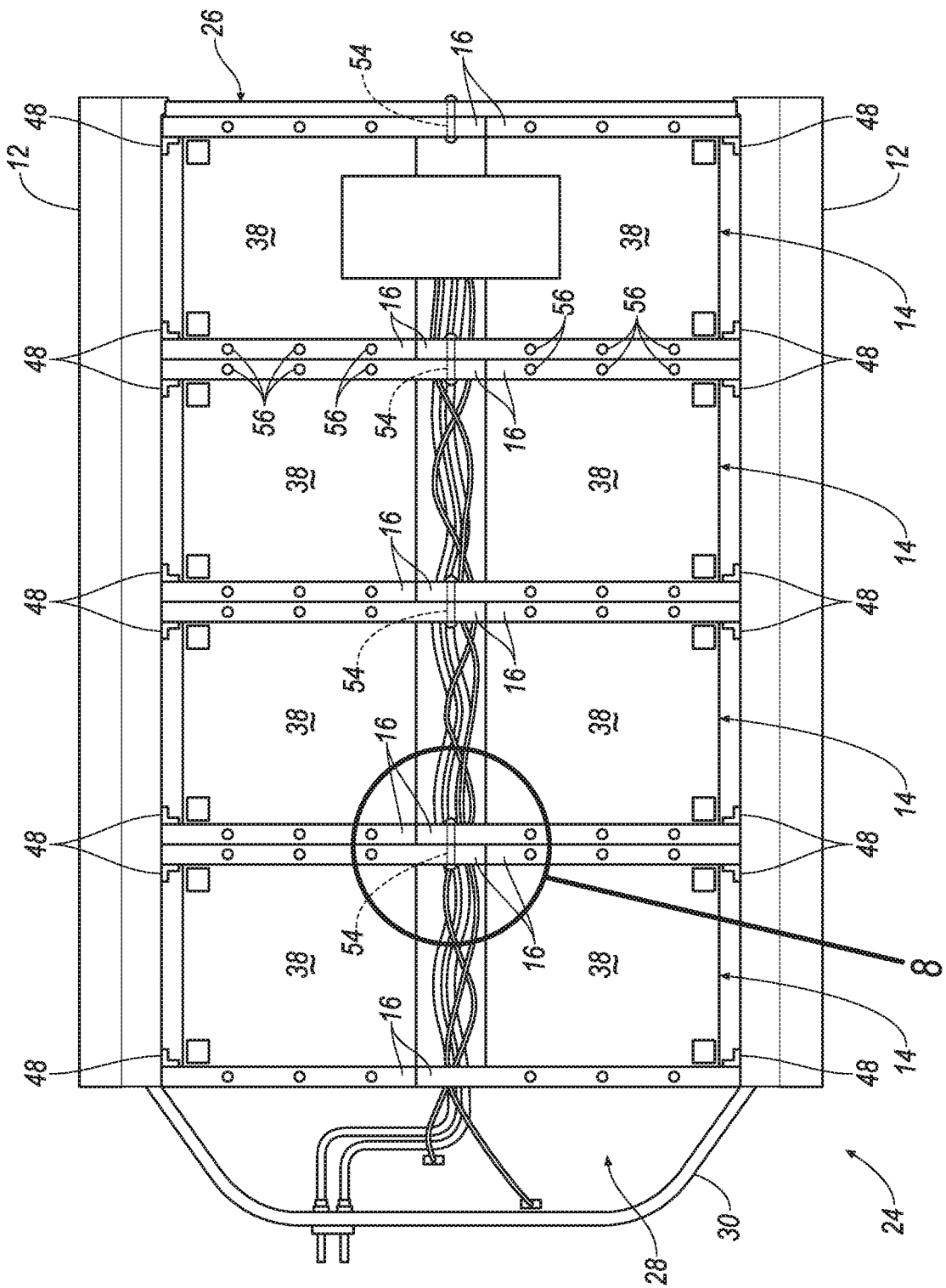
FIG. 3 is a top view of the vehicle-battery assembly including four battery modules.

The tray 26 includes the members 12. For example, in one embodiment is shown in FIGS. 1-3, the members 12 of the tray 26 also act as the frame rails 22 of the vehicle frame, e.g., the frame rail 22. As another example, in the embodiment in FIG. 9, the members 12 of the tray 26 are fixed to the frame rails 22 of the vehicle frame, e.g., by fasteners and/or welding.

As set forth above, the members 12 are elongated along an axis, e.g., the vehicle longitudinal axis A. The members 12 may be parallel to each other. The members 12 may be, for example, steel, aluminum, composite, etc. A floor of the vehicle 10, i.e., the floor of the passenger compartment, may be connected directly to the members 12, e.g., by fasteners and/or welding. The floor may support, for example, seats for occupants.

The tray 26 may include a front wall 30 and/or a rear wall 32 extending from one of the members 12 to the other of the members 12. In the example shown in the figures, the tray 26 includes the front wall 30 and the rear wall 32 spaced from each other along the vehicle longitudinal axis A with each of the battery modules 14 disposed between the front wall 30 and the rear wall 32. The battery compartment 28 is defined between the front wall 30 and the rear wall 32. The front wall 30 and the rear wall 32 may be fixed to the members 12, e.g., by fasteners and/or welding.

The tray 26 may include a bottom panel 34 and/or a top panel 36. The bottom panel 34 and the top panel 36 may be fixed to the members 12, the front wall 30, and the rear wall 32 to enclose the battery modules 14. In such an example, the battery compartment 28 is defined between the bottom panel 34 and the top panel 36. The bottom panel 34 may be exposed to the road surface and may prevent intrusion of precipitation and dirt to the battery modules 14. The top panel 36 may separate the battery compartment 28 from components of the vehicle 10 above the vehicle-battery assembly 24, e.g., a passenger compartment. The bottom panel 34 and the top panel 36 may be fixed to the members 12, the front wall 30, and the rear wall 32, e.g., by fasteners 56 and/or welding. The members 12, front wall 30, rear wall 32, bottom panel 34, and top panel 36 may be sealed to each other such that the battery compartment 28 is environmentally sealed, i.e., to prevent intrusion of road precipitation and dirt. The top panel 36 may be sandwiched between the floor of the passenger compartment and the members 12. As another example, the top panel 36 may be the floor of the passenger compartment.

Each battery module 14 includes the end plates 16, battery cells 18, and at least one connector 20. As set forth above, the battery cells 18 are sandwiched between the end plates 16. In other words, the battery cells 18 are between the end plates 16 and the end plates 16 retain the battery cells 18 therebetween. The end plates 16 may compress the battery cells 18 therebetween. For example, the connector 20 may draw the end plates 16 toward each other to compress the battery cells 18 between the end plates 16.

Figure 4:
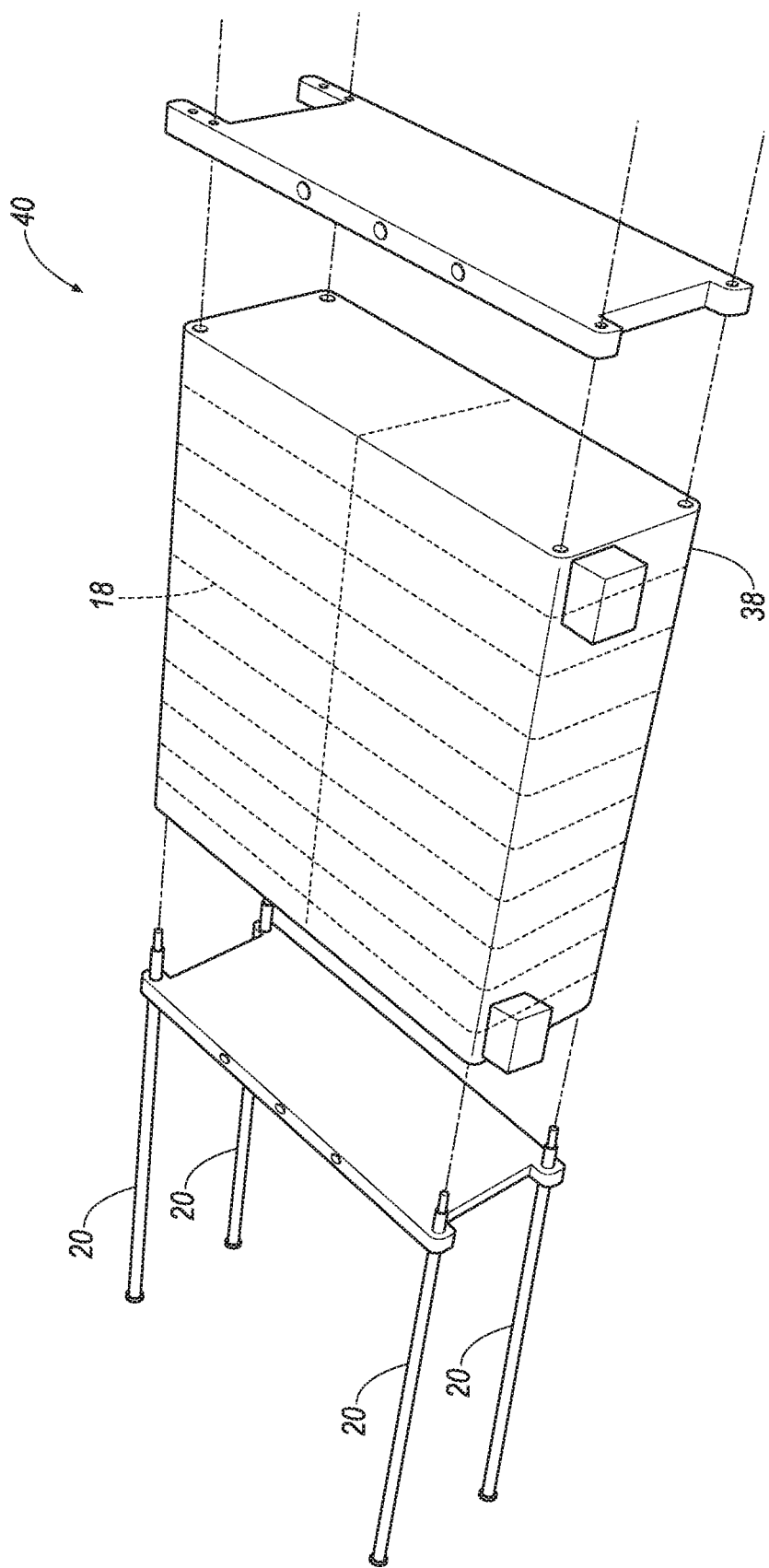
FIG. 4 is a partially exploded view of a segment of one battery module.
Figure 5:
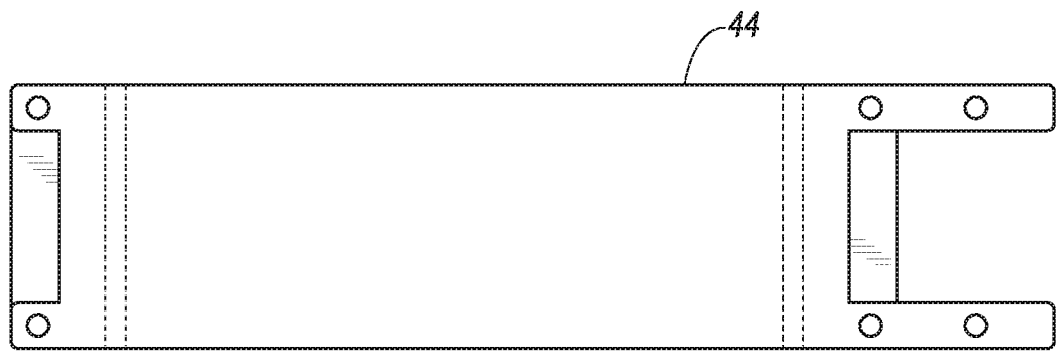
FIG. 5 is a side view of a long section of an end plate of the battery module.
Figure 6:
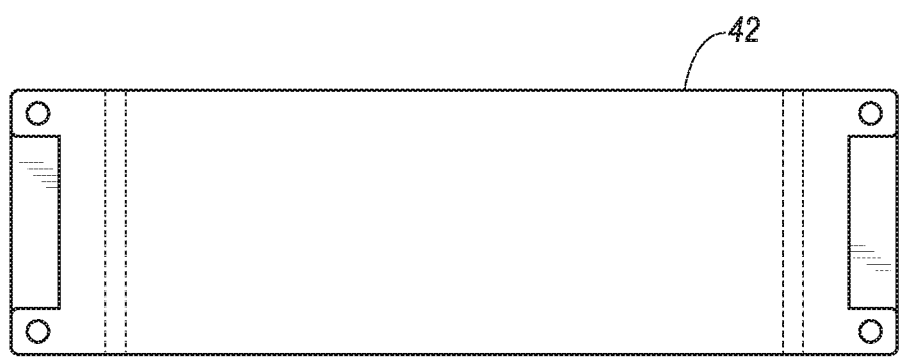
FIG. 6 is a side view of a short section of an end plate of the battery module.

The battery cells 18 may be pouch cells having a flexible outer bag and electrodes, e.g., conductive foil tabs, that extend through the flexible outer bag. In such an example, the battery cells 18 are stacked between the end plates 16, e.g., arranged consecutively from one end plate 16 to the other end plate 16, i.e., arranged consecutively along the vehicle longitudinal axis A. The end plates 16 provide rigidity to the battery cells 18. The end plates 16 are rigid relative to the flexible outer bag. The battery cells 18 may be disposed in a casing 38, as shown in FIG. 4. The end plates 16 may be rigid relative to the casing 38. During a vehicle 10 impact, the end plates 16 transfer loads between the members 12 to limit or prevent loads on the battery cells 18 (and on the casing 38 in examples including the casing 38). The battery cells 18 may be, for example, lithium based.

As set forth above, the end plates 16 extend from one of the members 12 to the other of the members 12. In other words, the end plates 16 abut both members 12. In the event of one of the members 12 being impacted, e.g., during a vehicle 10 impact, the end plates 16 transfer loads from the impacted member to the other member to eliminate or reduce loads on the battery cells 18 and to eliminate or reduce intrusion of the impacted member into the battery compartment 28. The end plates 16 may be elongated perpendicular to the members 12, e.g., perpendicular to the vehicle longitudinal axis A. The end plate 16 may have more than one section (e.g., sections 42, 44 described below), in which case the sections are arranged consecutively from one member to the other member. As another example, the end plate 16 may be one-piece from one member to the other member.

Figure 7:
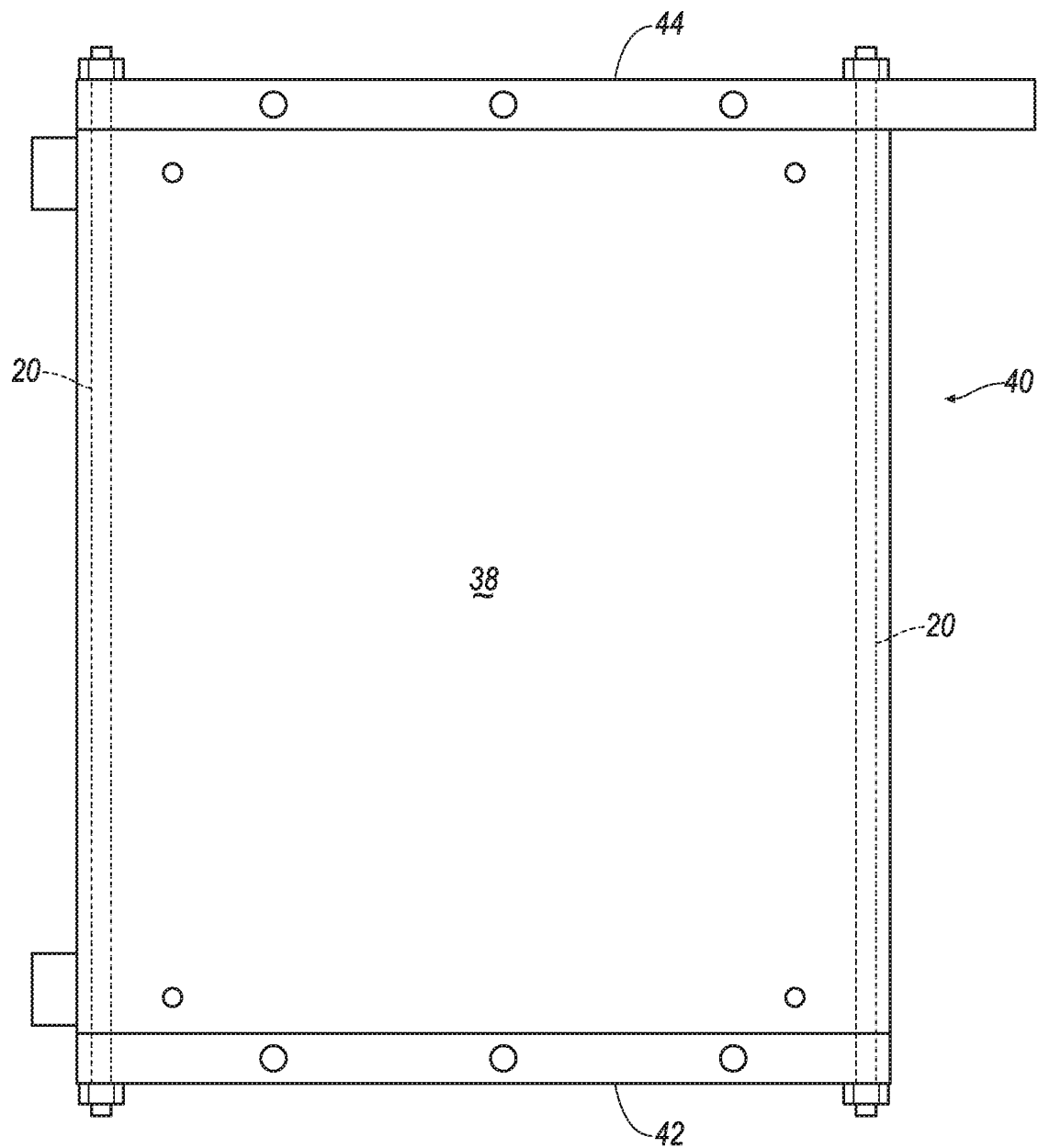
FIG. 7 is a top view of a segment of one battery module.

Each battery module 14 may include more than one segment 40 arranged consecutively from one member 12 to the other member 12. For example, the battery cells 18 shown in the Figures includes two segments 40. One of the segments 40 is shown in FIGS. 4 and 7. With reference to FIGS. 1-3, in such an example, each end plate 16 may include sections, e.g., a short section 42 and a long section 44 as described further below, and the battery module 14 may include two groups 46 of the battery cells 18 between opposing sections 44, 46 of the end plates 16.

The sections 44, 46 of the end plates 16 and the connectors 20 may be common among each segment 40. For example, each segment 40 of the battery module 14 may include the short section 42 and the long section 44 of end plates 16. In addition, the groups of battery cells 18 of each segment 40 may be common, i.e., each segment 40 may include identical groups battery cells 18. The short section 42 and the long section 44 of the end plates 16 may compress the battery cells 18 therebetween. In the example shown in FIGS. 1-3, the vehicle-battery assembly 24 includes eight identical segments 40 combined to form four battery modules 14. The interchangeability of the segments 40 decreases design, manufacturing, and assembly costs.

The end plates 16 may be fixed to the bottom panel 34 of the tray 26. For example, the end plates 16 may be bolted to the bottom panel 34 and/or the top panel 36. In such an example, the end plates 16 may include holes (identified in FIGS. 4-7) that receive bolts (identified in FIGS. 2-3) that engage the bottom panel 34 and/or the top panel 36.

Flanges 48, also referred to as handoff brackets, may connect the end plates 16 to the members 12. The flanges 48 are fixed to respective member 12 and end plate 16. As an example, the flange 48 may be unitary with one of the end plate 16 or the member 16 and connected to the other to the end plate 16 or the member 16, e.g., by fasteners and/or welding. As another example, the flange 48 may be connected to the end plate 16 and the member 16, e.g., by fasteners and/or welding.

The end plates 16 may be of a material with relatively high heat conductivity. As one example, the end plates 16 may be aluminum. The end plates 16 may be, for example, extruded, i.e., has the structural characteristics, i.e., shape, size, geometry, etc., of a component that is formed by extrusion.

As set forth above, each battery module 14 includes at least one connector 20. The connector 20 connects the end plates 16 of the battery module 14 together. The connector 20 extends from end plate 16 to end plate 16 and is elongated along the vehicle longitudinal axis A. The connector 20 may provide structure to the battery module 14, e.g., maintain the end plates 16 at desired relative positions and/or maintain the battery cells 18 between the end plates 16. As one example, the connector 20 may be a lag bolt, e.g., with a head at one end with the other end being threaded engaged by a nut.

In the example shown in the Figures, each segment 40 may include four connectors 20 connecting the long section 44 and the short section 42. In this example, the connects are generally at corners of the long section 44 and the short section 42.

With reference to FIGS. 1-3, end plates 16 of adjacent battery modules abut each other. The end plates 16 abutting each other may be connected to each other to increase load capacity, i.e., to increase structural rigidity to resist buckling. As an example, the end plates 16 may be fastened to each other with a fastener 54, e.g. a threaded fastener, rivet, etc.

Figure 8A:
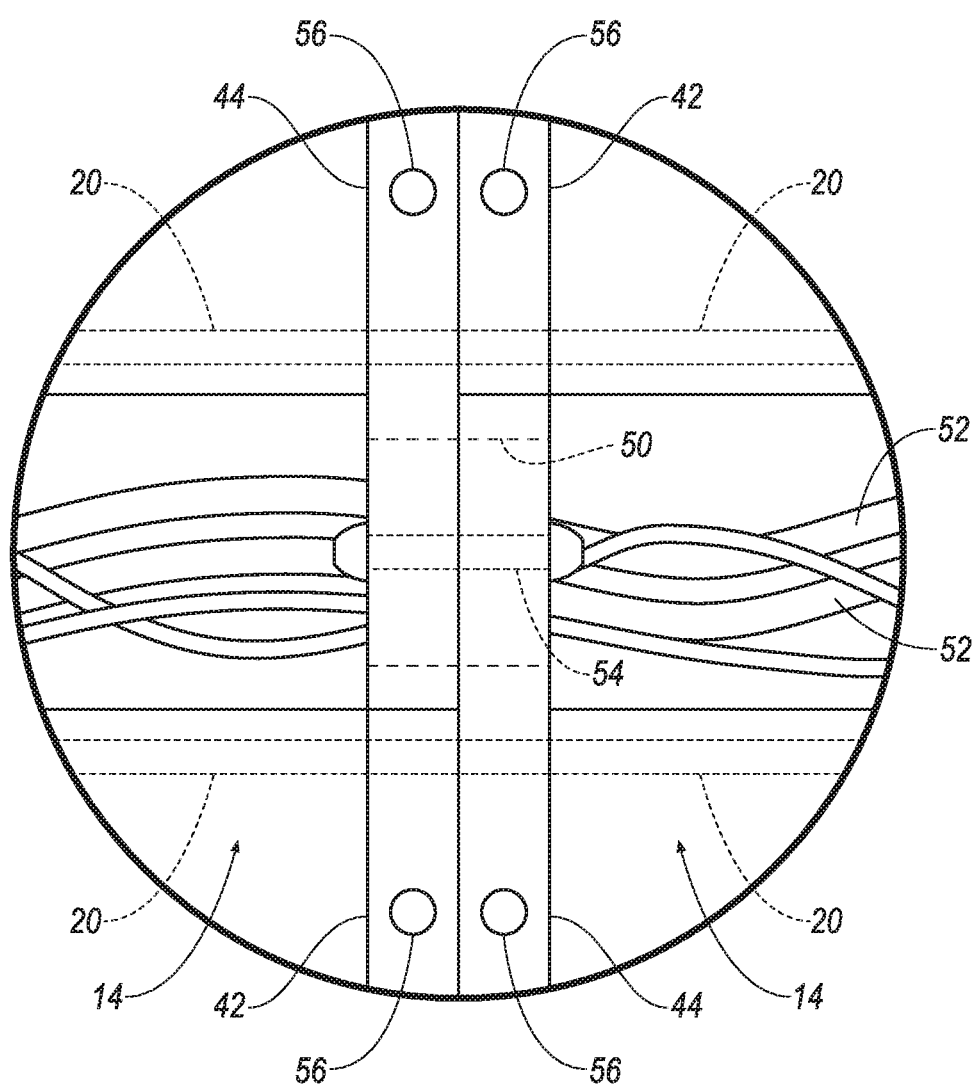
FIG. 8A is a magnified view of an interface between two adjacent battery modules.
Figure 8B:
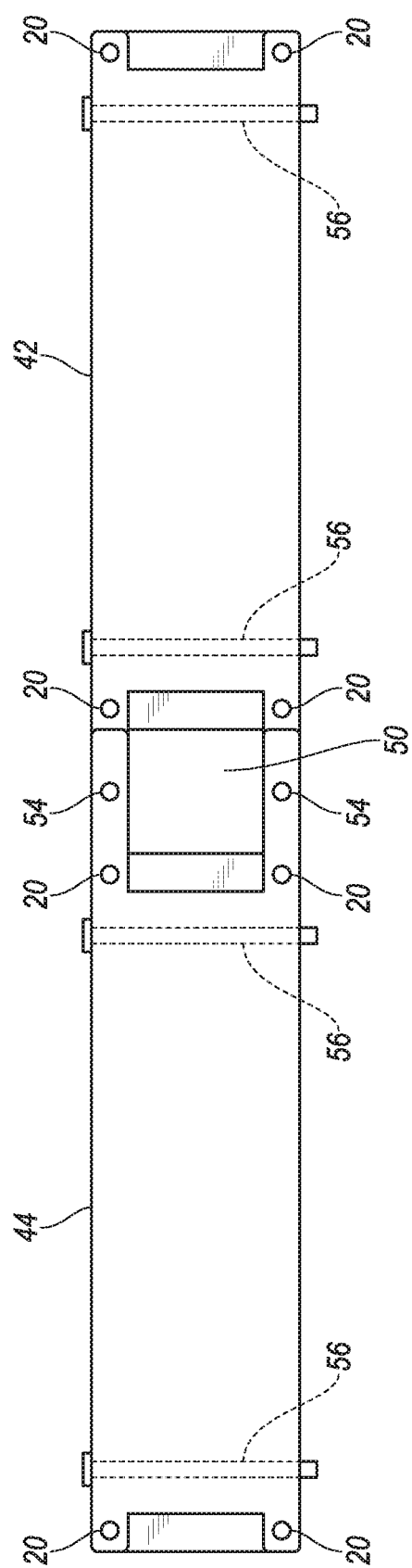
FIG. 8B is a side view of a segment of one battery module.

Specifically, in the example shown in the Figures, segments 40 of the battery module 14 are arranged such that the short section 42 and long section 44 are aligned between the members 12, i.e., stacked in cross-vehicle 10 direction. The long section 44 and the short section 42 of adjacent battery modules 14 abut each other. In addition, the long sections 44s of the adjacent battery modules 14 abut each other and are connected to each other, e.g., with the fastener 54 as shown in FIG. 8A. This reinforces the end plates 16. In other words, this ties the end plates 16 together to increase load capacity, i.e., to increase structural rigidity to resist buckling.

The end plates 16 of the adjacent battery modules 14 define a cooling line passage 50. The cooling ling passage 50 may receive a cooling line 52 (see FIGS. 3 and 8A) that carries coolant, i.e., refrigerant, for cooling the end plates 16 and ultimately the battery cells 18. As an example, the end plates 16 of the adjacent battery modules 14 may define the cooling line passage 50. The cooling line passages 50 of all of the battery modules 14 may be aligned along the vehicle longitudinal axis A.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   two members spaced from each other and elongated along a vehicle-longitudinal axis; and
   a first battery module including end plates spaced from each other along the vehicle-longitudinal axis, battery cells sandwiched between the end plates, and a connector extending from one end plate to the other end plate;
   a second battery module having end plates spaced from each other along the vehicle-longitudinal axis and battery cells sandwiched between the end plates, one of the end plates of the second battery module abutting one of the end plates of the first battery module;
   the end plates extending from one of the members to the other of the members;
   each of the end plates of the first battery module and the second battery module having a short section and a long section between the members, the short section of one end plate of the first battery module abutting the long section of one end plate of the second battery module.

2. The vehicle as set forth in claim 1, wherein the end plates of the first and second battery modules are elongated perpendicular to the vehicle-longitudinal axis.

3. The vehicle as set forth in claim 1, wherein the connector is elongated along the vehicle-longitudinal axis.

4. The vehicle as set forth in claim 1, further comprising a bottom panel connected to the end plates of the first and second battery modules.

5. The vehicle as set forth in claim 1, wherein the end plates of the first battery module and the second battery module define a cooling line passage.

6. The vehicle as set forth in claim 1, wherein the short section of the one end plate of the first battery module is connected to the long section of the one end plate of the second battery module.

7. The vehicle as set forth in claim 1, wherein the long sections of the one end plate of the first battery module and the one end plate of the second battery module abut each other and are connected to each other.

8. The vehicle as set forth in claim 1, wherein the members are vehicle frame rails.

9. The vehicle as set forth in claim 1, further comprising vehicle frame rails, the member being fixed to the vehicle frame rails.

10. A vehicle-battery assembly comprising:
    a tray including two members spaced from each other and elongated along an axis; and
    a first battery module including end plates spaced from each other along the axis, battery cells sandwiched between the end plates, and a connector extending from one end plate to the other end plate;
    the end plates extending from one of the members to the other of the members;
    a second battery module having end plates spaced from each other along the axis and battery cells sandwiched between the end plates, one of the end plates of the second battery module abutting one of the end plates of the first battery module;
    each of the end plates of the first battery module and the second battery module having a short section and a long section between the members, the short section of one end plate of the first battery module abutting the long section of one end plate of the second battery module.

11. The vehicle-battery assembly as set forth in claim 10, wherein the end plates of the first and second battery modules are elongated perpendicular to the axis.

12. The vehicle-battery assembly as set forth in claim 10, wherein the connector is elongated along the axis.

13. The vehicle-battery assembly as set forth in claim 10, wherein the tray includes a bottom panel connected to the end plates of the first and second battery modules.

14. The vehicle-battery assembly as set forth in claim 10, wherein the short section of the one end plate of the first battery module is connected to the long section of the one end plate of the second battery module.

15. The vehicle-battery assembly as set forth in claim 10, wherein the long sections of the one end plate of the first battery module and the one end plate of the second battery module abut each other and are connected to each other.

* * * * *